(12) United States Patent
Sane et al.

(10) Patent No.: US 9,549,376 B2
(45) Date of Patent: Jan. 17, 2017

(54) ELECTRONIC DEVICE WITH REDUCED POWER CONSUMPTION

(71) Applicant: Apple Inc., Cupertino, CA (US)

(72) Inventors: Sachin J. Sane, Santa Clara, CA (US); Aravind Radhakrishnan, Sunnyvale, CA (US); Umesh K. Shukla, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 255 days.

(21) Appl. No.: 13/683,968

(22) Filed: Nov. 21, 2012

(65) Prior Publication Data

US 2014/0066038 A1    Mar. 6, 2014

Related U.S. Application Data

(60) Provisional application No. 61/695,945, filed on Aug. 31, 2012.

(51) Int. Cl.
*H04M 3/00*       (2006.01)
*H04W 52/02*     (2009.01)

(52) U.S. Cl.
CPC ........... *H04W 52/0274* (2013.01); *Y02B 60/50* (2013.01)

(58) Field of Classification Search
CPC .......................... H04W 8/245; H04M 1/72525
USPC ....................................... 455/418, 437, 435.2
See application file for complete search history.

(56) References Cited

U.S. PATENT DOCUMENTS

| | | | |
|---|---|---|---|
| 2010/0142504 A1* | 6/2010 | Bitran ................... | H04W 88/06 370/338 |
| 2011/0212746 A1* | 9/2011 | Sarkar ............... | H04W 52/0274 455/552.1 |
| 2012/0214489 A1* | 8/2012 | Koo et al. ..................... | 455/436 |
| 2012/0224563 A1* | 9/2012 | Zisimopoulos et al. ...... | 370/331 |

* cited by examiner

*Primary Examiner* — Chuck Huynh
(74) *Attorney, Agent, or Firm* — Sterne, Kessler, Goldstein & Fox PLLC

(57) ABSTRACT

In order to improve the management of the power consumption of electronic devices (such as cellular telephones), the operating mode of an interface circuit in an electronic device may be changed when certain commands are received. In particular, when one or more commands are received that disable data communication via the interface circuit and a cellular-telephone network and/or enable communication via another interface circuit in the electronic device and a wireless local area network (WLAN), the interface circuit may be transitioned to an operating mode in which data communication via the cellular-telephone network using a communication protocol that supports only data and no voice is disabled. For example, the communication protocol may include a Long Term Evolution (LTE)-compatible communication protocol.

23 Claims, 4 Drawing Sheets

ELECTRONIC DEVICE WITH REDUCED POWER CONSUMPTION

CROSS REFERENCE TO RELATED APPLICATION

This application claims priority under 35 U.S.C. §119(e) to U.S. Provisional Application Ser. No. 61/695,945, entitled "Electronic Device with Reduced Power Consumption," by Sachin J. Sane, Aravind Radhakrishnan, and Umesh K. Shukla, filed on Aug. 31, 2012, the contents of which is herein incorporated by reference.

BACKGROUND

Field

The described embodiments relate to techniques for managing power consumption of an electronic device.

Related Art

The increasing functionality and popularity of electronic devices, such as cellular telephones, has resulted in demand for significantly higher data rates. For example, many software applications that execute on these electronic devices provide rich user experiences by receiving and transmitting large amounts of information with other electronic devices.

However, electronic devices with higher data rates typically consume significantly more power. In portable electronic devices, this increased power consumption usually decreases the operating time between recharging of the battery. In turn, the reduced operating time can degrade the user experience, which can be frustrating for consumers, and thus can adversely impact sales and customer retention.

SUMMARY

The described embodiments include an electronic device that includes: a first antenna; a second antenna; an interface circuit, coupled to the antenna, that communicates information via a cellular-telephone network; a second interface circuit, coupled to the second antenna, that communicates second information via a wireless local area network (WLAN); a processor coupled to the interface circuit and the second interface circuit; and memory that stores a program module that is executed by the processor. The program module facilitates management of operating modes of the interface circuit. After the program module receives the command disabling data communication via the cellular-telephone network and/or the second command enabling communication via the WLAN, the program module transitions the interface circuit to an operating mode. In this operating mode, data communication via the cellular-telephone network using a communication protocol having a higher data rate than third-generation cellular technology is disabled.

Note that the communication protocol may include a Long Term Evolution (LTE)-compatible communication protocol. Moreover, communication via the WLAN may involve a Wi-Fi-compatible communication protocol.

In some embodiments, the program module receives a third command enabling data communication via the cellular-telephone network. After the program module receives the third command, the program module transitions the interface circuit to a second operating mode in which data communication via the cellular-telephone network using the communication protocol is enabled. Alternatively or additionally, the program module receives a fourth command disabling communication via the WLAN. After the program module receives the fourth command, the program module transitions the interface circuit to the second operating mode. Note that, when the interface circuit is in the second operating mode, power consumption of the electronic device is increased relative to that in the operating mode.

Another embodiment provides a method that includes at least some of the operations performed by the electronic device.

Another embodiment provides a computer-program product for use with the electronic device. This computer-program product includes instructions for at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to improve the management of the power consumption of electronic devices (such as cellular telephones), the operating mode of an interface circuit in an electronic device may be changed when certain commands are received. In particular, when one or more commands are received that disable data communication via the interface circuit and a cellular-telephone network and/or enable communication via another interface circuit in the electronic device and a wireless local area network (WLAN), the interface circuit may be transitioned to an operating mode in which data communication via the cellular-telephone network using a communication protocol having a higher data rate than third-generation cellular technology is disabled. Note that third-generation cellular technology is compatible with International Mobile Telecommunications-2000 specifications by the International Telecommunication Union of Geneva Switzerland, such as the Universal Mobile Telecommunications System (UMTS) or Wideband Code Division Multiple Access (WCDMA). In the discussion that follows, the communication protocol may include a Long Term Evolution (LTE)-compatible communication protocol (such as LTE 4G or LTE Advanced from the $3^{rd}$ Generation Partnership Project in Asia, Europe and North America) with data rates between 100 Mb/s and 1 Gb/s, and communication via the WLAN may involve a Wi-Fi-compatible communication protocol (i.e., a communication protocol compatible with one or more of the Institute of Electrical and Electronics Engineers (IEEE) standard 802.11). However, these are illustrative examples, and the communication technique can be used with a variety of communication protocols.

Figure 1:
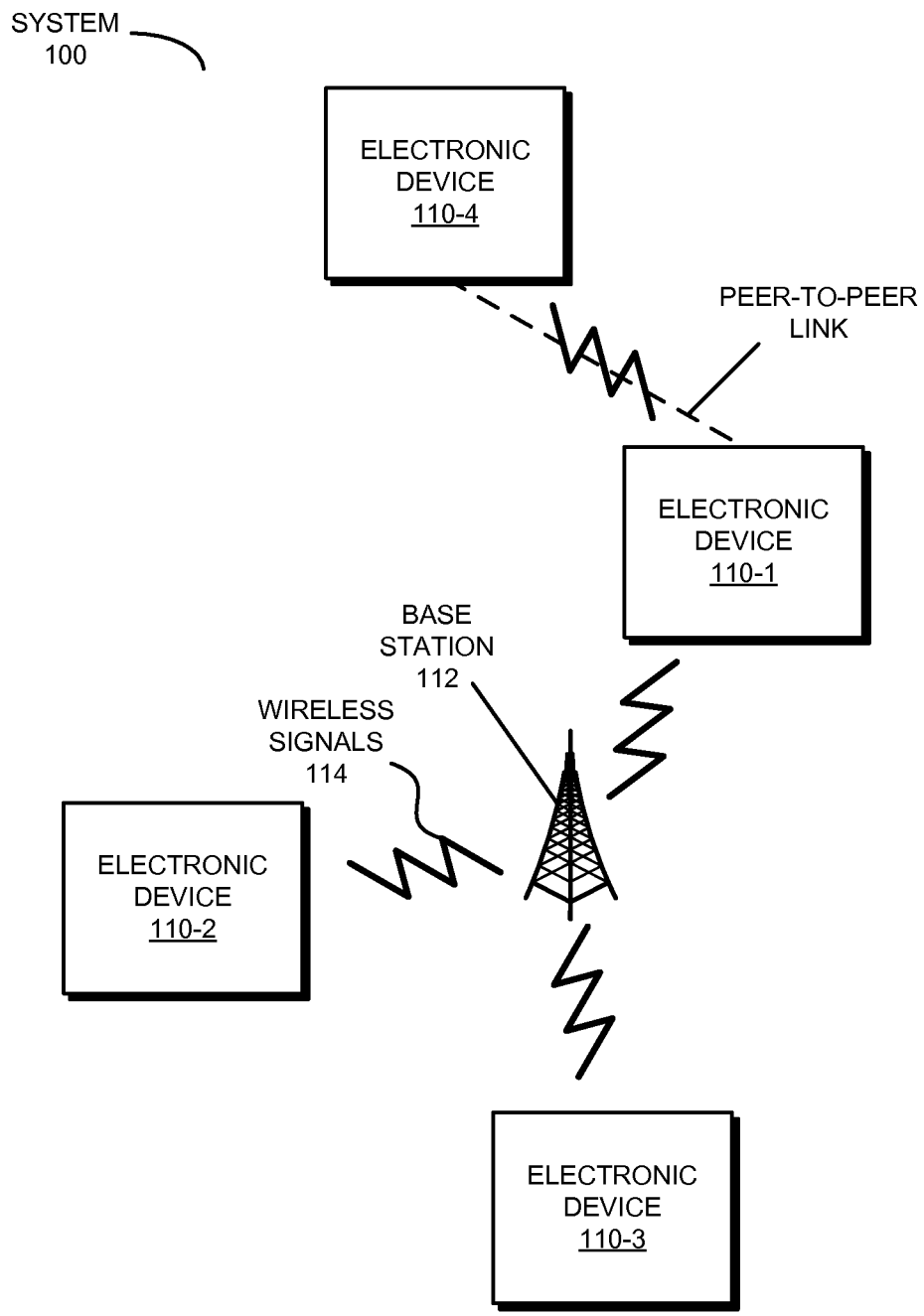
FIG. 1 is a block diagram illustrating electronic devices wirelessly communicating in accordance with an embodiment of the present disclosure.

The communication between the electronic devices is shown in FIG. 1, which presents a block diagram illustrating electronic devices 110 wirelessly communicating. In particular, these electronic devices may wirelessly communicate via a cellular network (using UMTS, LTE, etc.), a WLAN, a Bluetooth™ (from the Bluetooth Special Interests Group of Kirkland, Wash.) network, and/or another type of wireless network. For example, the wireless communication may involve communicating information via an established wireless network, such as via a base station 112. Alternatively, the wireless communication may involve electronic devices 110: discovering one another by scanning wireless channels; transmitting and receiving advertising frames on wireless channels to enable electronic devices 110 to make initial contact, followed by exchanging subsequent data/management frames (such as connect requests) to establish a connection; configuring security options (e.g., IPSEC); transmitting and receiving packets or frames via the connection, etc.

As described further below with reference to FIG. 4, each of electronic devices 110 may include subsystems, such as a networking subsystem, a memory subsystem and a processor subsystem. In addition, electronic devices 110 may include radios in the networking subsystems. More generally, electronic devices 110 can include (or can be included within) any electronic devices with the networking subsystems that enable electronic devices 110 to wirelessly communicate with another electronic device.

As can be seen in FIG. 1, wireless signals 114 (represented by jagged lines) are transmitted from a radio in electronic device 110-1. These wireless signals 114 are received by radios in one or more of the other electronic devices in FIG. 1, either directly or indirectly (for example, wireless signals 114 may be relayed by base station 112).

In the described embodiments, processing information (such as a packet or frame) in either of electronic devices 110-1 and 110-2 includes: receiving wireless signals 114 with the information; decoding/extracting the information from received wireless signals 114 to acquire the information; and processing the information (such as a command or a payload in a frame or a packet).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving information.

The wireless communication capabilities of electronic devices 110 may not be static. For example, a user of one of electronic devices 110 (such as electronic device 110-1) may have a variety of wireless communication services available at their home or office, such as Wi-Fi or WiMax (which are examples of WLANs). These wireless communication services may provide faster data rates than a cellular telephone network. In addition, data communication via these wireless communication services may be less expensive than the data planes offered by cellular-telephone service providers, and this data communication may not be limited (e.g., there may not be expensive overage charges).

As a consequence, when one of the wireless communication services is available, the user may disable data communication via the cellular-telephone network (however, voice communication via the cellular-telephone network may still be enabled so the user can receive incoming phone calls). Furthermore, because high-data-rate data communication via the cellular-telephone network typically consumes significant amounts of power, the user may disable data communication via the cellular-telephone network when their battery is almost discharged, thereby preventing further power consumption by frequent background data traffic on electronic device 110-1 and, thus, extending the time until the battery needs to be recharged.

For example, many cellular telephones are equipped to communicate using several communication protocols, such as: UTMS, Global System for Mobile Communication (GSM), and LTE. While GSM and UMTS support both voice and data communication, in the next few years LTE is expected to only support data communication. Moreover, even when data communication is idle, many cellular telephones default to LTE. However, even periodic background communication via LTE can consume significant amounts of power (e.g., the power consumption is larger than when UMTS or GSM is used). For example, LTE neighbor searches every discontinuous reception (DRX) cycle consume significant amounts of power.

Furthermore, these types of data-driven configuration defaults may result in a cellular telephone staying on a weak signal or communication protocol, even though a stronger (albeit lower data rate) alternative (such as GSM) is available. This can reduce the quality and/or reliability of voice communication. In particular, once electronic device 110-1 camps on LTE, and the user makes/receives a voice call, electronic device 110-1 may have to do a circuit-switched fallback to UMTS or GSM to set up the voice call. This procedure can be cumbersome, and often leads to significantly higher voice-call setup delays or even a call drop sometimes.

To address these problems, if cellular data communication is disabled on electronic device 110-1 (e.g., the user turns it off using a user interface and/or WLAN is available and enabled), LTE radio access technology may be disabled. Note that disabling a radio access technology means that electronic device 110-1 may not search and look for cells that belong or use the same radio access technology. When electronic device 110-1 is in this operating mode, it may try to camp on the strongest GSM or UMTS cell which offers the best for voice communication. (Thus, by disabling LTE, the user experience with voice communication may be improved.) Moreover, when cellular data communication is enabled on electronic device 110-1 (e.g., the user turns it on and/or communication via the WLAN is unavailable or is disabled), electronic device 110-1 may resume normal operation per the current design and communication standards (i.e., LTE may be enabled).

Figure 2:
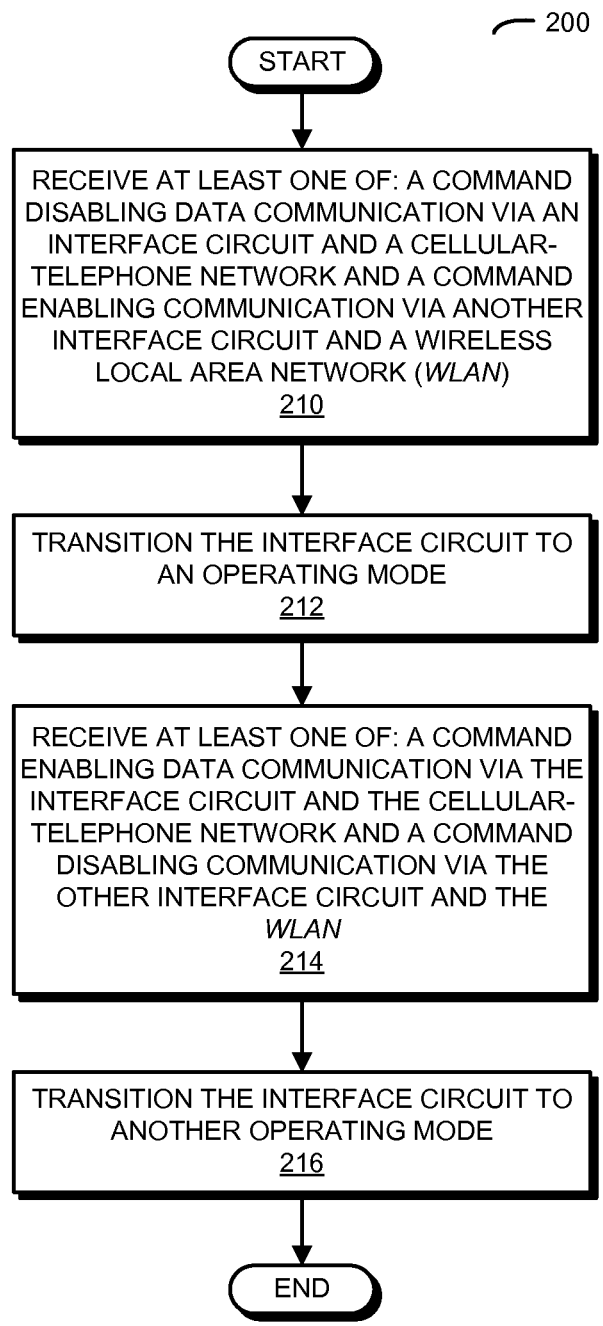
FIG. 2 is a flow diagram illustrating a method for managing operating modes of an electronic device in accordance with an embodiment of the present disclosure.
Figure 4:
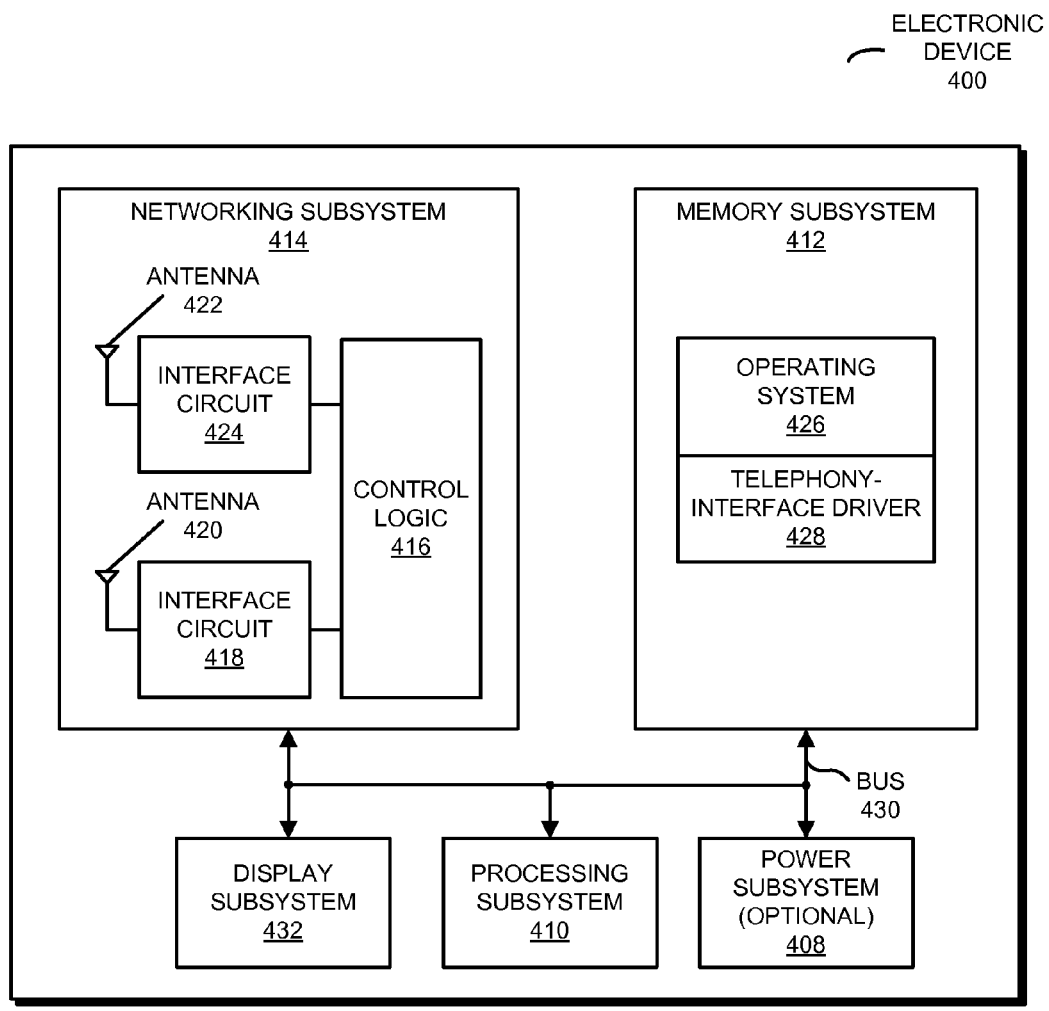
FIG. 4 is a block diagram illustrating an electronic device in accordance with an embodiment of the present disclosure.

This communication technique is shown in FIG. 2, which presents a flow diagram illustrating a method 200 for managing operating modes of an electronic device, such as electronic device 400 (FIG. 4). During operation, a program module executed by a processor in the electronic device receives (operation 210) at least one of: a command disabling data communication via the interface circuit and a cellular-telephone network; and a command enabling communication via another interface circuit in the electronic device and a WLAN. After a program module executed by the processor receives the command disabling data communication via the cellular-telephone network and/or the command enabling communication via the WLAN, the program module transitions the interface circuit to an operating mode (operation 212). In this operating mode, data communication via the cellular-telephone network using a communication protocol having a higher data rate than third-generation cellular technology is disabled.

As noted previously, the communication protocol may include an LTE-compatible communication protocol. Moreover, communication via the WLAN may involve a Wi-Fi-compatible communication protocol.

In some embodiments, when the program module receives (operation 214) a command enabling data communication via the cellular-telephone network and/or a command disabling communication via the WLAN, the program module transitions the interface circuit to another operating mode (operation 216) in which data communication via the cellular-telephone network using the communication protocol is enabled. When the interface circuit is in the other operating mode, power consumption of the electronic device is increased relative to that in the operating mode.

Figure 3:
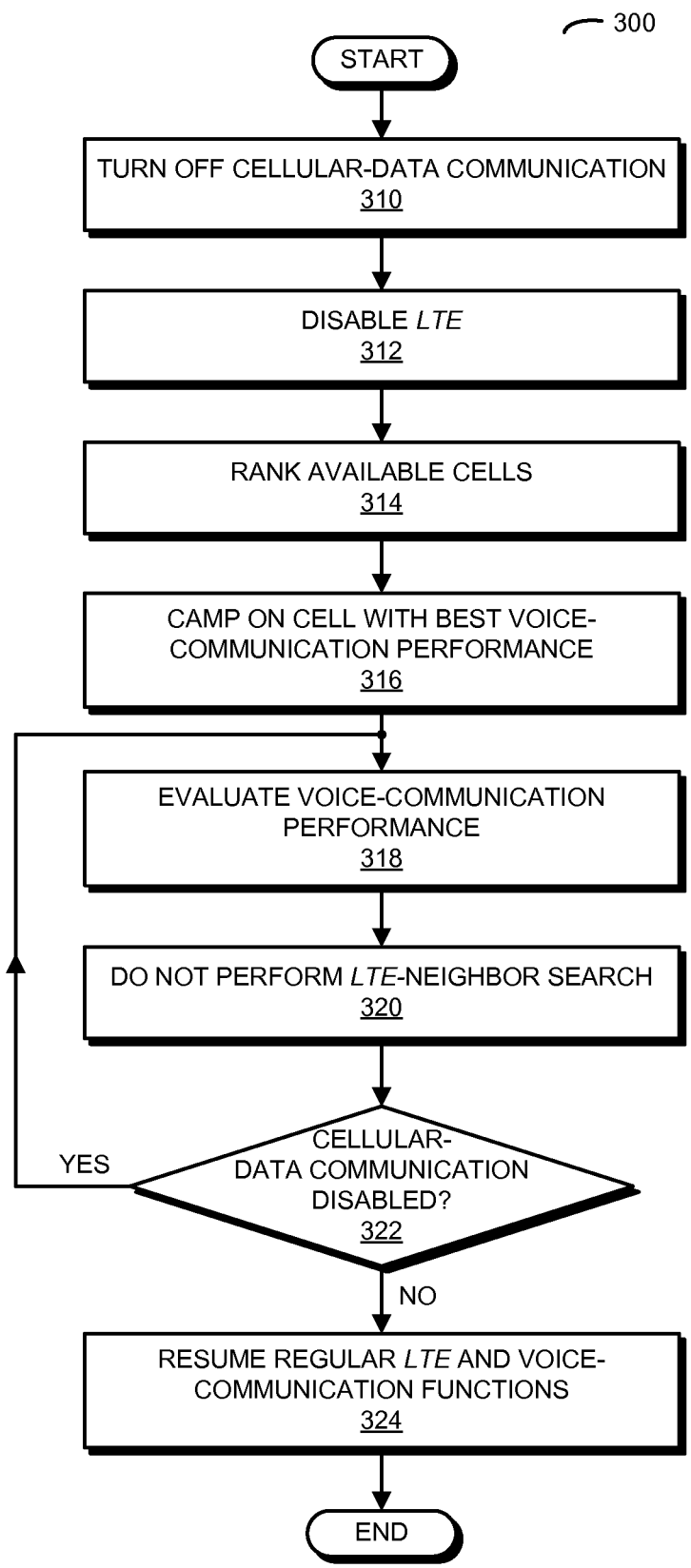
FIG. 3 is a flow diagram illustrating a method for managing operating modes of an electronic device in accordance with an embodiment of the present disclosure.

Further detail of the communication technique in an exemplary embodiment is shown in FIG. 3, which presents a flow diagram illustrating a method 300 for managing operating modes of an electronic device, such as electronic device 400 (FIG. 4). During operation of the electronic device, a user may turn off cellular-data communication (operation 310). In response, the electronic device may disable LTE (operation 312), i.e., the interface circuit may be transitioned to the operating mode.

While in the operating mode, the electronic device may rank available cells (operation 314), such as GSM or WCDMA cells. Moreover, the electronic device may camp on the cell with the best voice-communication performance (operation 316), such as the cell with the strongest signal. As long as cellular-data communication is disabled (operation 322), the electronic device may evaluate the voice-communication performance (operation 318) and may not perform an LTE-neighbor search (operation 320). However, when cellular-data communication is enabled (operation 322), the electronic device may resume regular LTE and voice-communication functions (operation 324).

Therefore, by selectively transitioning the interface circuit to the operating mode when data communication via the communication protocol (such as LTE) is not needed, the communication technique may reduce the power consumption of the electronic device. Moreover, because the electronic device may camp on the best cell (e.g., among GSM and WCDMA), voice-call reliability may improve. In these ways, the communication technique may improve the user experience, which may improve sales of the electronic device, as well as customer retention.

In some embodiments of methods 200 (FIG. 2) and 300 (FIG. 3), there may be additional or fewer operations. Moreover, the order of the operations may be changed, and/or two or more operations may be combined into a single operation.

We now describe embodiments of the electronic device. FIG. 4 presents a block diagram illustrating an electronic device 400. This electronic device includes processing subsystem 410, memory subsystem 412, and networking subsystem 414. Processing subsystem 410 includes one or more devices configured to perform computational operations. For example, processing subsystem 410 can include one or more microprocessors, application-specific integrated circuits (ASICs), microcontrollers, programmable-logic devices, and/or one or more digital signal processors (DSPs).

Memory subsystem 412 includes one or more devices for storing data and/or instructions for processing subsystem 410 and networking subsystem 414. For example, memory subsystem 412 can include dynamic random access memory (DRAM), static random access memory (SRAM), and/or other types of memory. In some embodiments, instructions for processing subsystem 410 in memory subsystem 412 include: one or more program modules or sets of instructions (such as telephony-interface driver 428, which may implement the communication technique), which may be executed by processing subsystem 410. Note that the one or more computer programs may constitute a computer-program mechanism. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured, to be executed by processing subsystem 410.

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Networking subsystem 414 includes one or more devices configured to couple to and communicate on a wired and/or wireless network (i.e., to perform network operations), including: control logic 416, an interface circuit 418 (such as a cellular-telephone baseband chip), antenna 420 coupled to interface circuit 418, an interface circuit 424 (such as a Wi-Fi chip), and antenna 422 coupled to interface circuit 424. For example, networking subsystem 414 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system. In particular, interface circuit 418 may communicate information via a cellular-telephone network, and interface circuit 424 may communicate the same or different information via a WLAN.

Networking subsystem 414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 400 may use the mechanisms in networking subsystem 414 for performing simple wireless communication between the electronic devices, e.g., transmitting advertising frames and/or scanning for advertising frames transmitted by other electronic devices as described previously.

As noted previously, during operation of electronic device 400, telephony-interface driver 428 may receive a command disabling data communication from operating system 426 executing in processing subsystem 410 and/or a command enabling the WLAN from interface circuit 424. In response, telephony-interface driver 428 (and, more generally, a program module) may transition interface circuit 418 into the operating mode (e.g., LTE may be disabled). Subsequently, if telephony-interface driver 428 receives a command enabling data communication from operating system 426 executing in processing subsystem 410 and/or a command disabling the WLAN from interface circuit 424, telephony-interface driver 428 may transition interface circuit 418 into the other operating mode (e.g., LTE may be enabled).

Furthermore, electronic device 400 may include an optional power subsystem 408, such as a battery that includes one or more battery packs and/or one or more battery cells.

Within electronic device 400, optional power subsystem 408, processing subsystem 410, memory subsystem 412, and networking subsystem 414 are coupled together using bus 430. Bus 430 may include an electrical, optical, and/or electro-optical connection that the subsystems can use to communicate commands and data among one another. Although only one bus 430 is shown for clarity, different embodiments can include a different number or configuration of electrical, optical, and/or electro-optical connections between the subsystems.

In some embodiments, the electronic device includes a display subsystem 432 for displaying information on a display, which may include a display driver and the display, such as a liquid-crystal display, a touchscreen, etc.

Electronic device 400 can be (or can be included in) any electronic device with at least one network interface. For example, electronic device 400 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 400, in alternative embodiments, different components and/or subsystems may be present in electronic device 400. For example, electronic device 400 may include one or more additional processing subsystems 410, memory subsystems 412, networking subsystems 414, and/or display subsystems 432. Additionally, one or more of the subsystems may not be present in electronic device 400. Moreover, in some embodiments, electronic device 400 may include one or more additional subsystems that are not shown in FIG. 4. For example, electronic device 400 can include, but is not limited to, a data collection subsystem, an audio and/or video subsystem, an alarm subsystem, a media processing subsystem, and/or an input/output (I/O) subsystem. Also, although separate subsystems are shown in FIG. 4, in some embodiments, some or all of a given subsystem or component can be integrated into one or more of the other subsystems or component(s) in electronic device 400. For example, in some embodiments telephony-interface driver 428 may be included in another software application (not shown) or an operating system 426 executing on electronic device 400.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 414, such as a radio. Moreover, the integrated circuit may include hardware and/or software mechanisms that are used for transmitting wireless signals from electronic device 400 (FIG. 4) and receiving signals at electronic device 400 from other electronic devices (FIG. 4). Aside from the mechanisms herein described, radios are generally known in the art and hence are not described in detail. In general, networking subsystem 414 (FIG. 4) and/or the integrated circuit can include any number of radios. Note that the radios in multiple-radio embodiments function in a similar way to the described single-radio embodiments.

In some embodiments, networking subsystem 414 (FIG. 4) and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device comprising:
a first interface circuit for communicating via a cellular-telephone network;
a processor coupled to the first interface circuit, wherein the processor is configured to:
receive a command to enable communication via a wireless local area network (WLAN) through a second interface circuit;
in response to the receiving the command, transition the first interface circuit from a first operating mode in which the first interface circuit maintains communication with the cellular-telephone network using a default communication protocol to a second operating mode in which the first interface circuit maintains communication with the cellular-telephone network using another communication protocol with a lower data rate than the default communication protocol;

compare the another communication protocol to a third communication protocol with a lower data rate than the default communication protocol; and communicate, in the second operating mode, with the cellular-telephone network using the another communication protocol or the third communication protocol based at least in part on the communication protocol with the higher voice communication signal strength.

2. The electronic device of claim 1, wherein the default communication protocol comprises a Long Term Evolution (LTE)-compatible communication protocol.

3. The electronic device of claim 2, wherein the another communication protocol with the lower data rate than the default communication protocol comprises a second-generation (2G) cellular communication protocol or a third-generation (3G) cellular communication protocol.

4. The electronic device of claim 2, wherein the another communication protocol with the lower data rate than the default communication protocol comprises a Global System for Mobile Communications (GSM) communication protocol or a Universal Mobile Telecommunications System (UMTS) communication protocol.

5. The electronic device of claim 1, wherein the processor is further configured to:
receive a second command to enable data communication via the cellular-telephone network; and
in response to the receiving the second command, transition the first interface circuit from the second operating mode to the first operating mode.

6. The electronic device of claim 1, wherein power consumption of the electronic device is reduced when the first interface circuit is in the second operating mode in comparison to when the first interface circuit is in the first operating mode.

7. The electronic device of claim 1, wherein the processor is further configured to:
receive a second command to disable communication via the WLAN; and
in response to the receiving the second command, transition the first interface circuit from the second operating mode to the first operating mode.

8. A method for managing an operation of a first interface circuit in an electronic device, the method comprising:
receiving a command to enable communication via a wireless local area network (WLAN) through a second interface circuit;
in response to the receiving the command, transitioning the first interface circuit from a first operating mode in which the first interface circuit maintains communication with the cellular-telephone network using a default communication protocol to a second operating mode in which the first interface circuit maintains communication with the cellular-telephone network using another communication protocol with a lower data rate than the default communication protocol;
comparing the another communication protocol to a third communication protocol with a lower data rate than the default communication protocol; and
communicating, in the second operating mode, with the cellular-telephone network using the another communication protocol or the third communication protocol based at least in part on the communication protocol with the higher voice communication signal strength.

9. The method of claim 8, wherein the default communication protocol comprises a Long Term Evolution (LTE)-compatible communication protocol.

10. The method of claim 9, wherein the communication protocol with the lower data rate than the default communication protocol comprises a second-generation (2G) cellular communication protocol or a third-generation (3G) cellular communication protocol.

11. The method of claim 9, wherein the communication protocol with the lower data rate than the default communication protocol comprises a Global System for Mobile Communications (GSM) communication protocol or a Universal Mobile Telecommunications System (UMTS) communication protocol.

12. The method of claim 8, further comprising:
receiving a second command to enable data communication via the cellular-telephone network; and
in response to the receiving the second command, transitioning the first interface circuit from the second operating mode to the first operating mode.

13. The method of claim 8, wherein the transitioning the first interface circuit from the first operating mode to the second operating mode comprises reducing power consumption of the electronic device in comparison to when the first interface circuit is in the first operating mode.

14. The method of claim 8, further comprising:
receiving a second command to disable communication via the WLAN; and
in response to the receiving the second command, transitioning the first interface circuit from the second operating mode to the first operating mode.

15. A non-transitory computer-readable storage medium storing instructions that, when executed by an electronic device, causes the electronic device to perform a method comprising:
receiving a command to disable data communication via a cellular-telephone network;
in response to the receiving the command, transitioning an interface circuit in the electronic device from a first operating mode in which the interface circuit maintains communication with the cellular-telephone network using a default communication protocol to a second operating mode in which the interface circuit maintains communication with the cellular-telephone network using another communication protocol with a lower data rate than the default communication protocol;
comparing the another communication protocol to a third communication protocol with a lower data rate than the default communication protocol; and
communicating, in the second operating mode, with the cellular-telephone network using the another communication protocol or the third communication protocol based at least in part on the communication protocol with the higher voice communication signal strength.

16. The non-transitory computer-readable storage medium of claim 15, wherein the default communication protocol comprises a Long Term Evolution (LTE)-compatible communication protocol.

17. The non-transitory computer-readable storage medium of claim 16, wherein the communication protocol with the lower data rate than the default communication protocol comprises a second-generation (2G) cellular communication protocol or a third-generation (3G) cellular communication protocol.

18. The non-transitory computer-readable storage medium of claim 16, wherein the communication protocol with the lower data rate than the default communication protocol comprises a Global System for Mobile Communications (GSM) communication protocol or a Universal Mobile Telecommunications System (UMTS) communication protocol.

19. The non-transitory computer-readable storage medium of claim 15, wherein the method further comprises:
receiving a second command to enable data communication via the cellular-telephone network; and
in response to the receiving the second command, transitioning the interface circuit from the second operating mode to the first operating mode.

20. The non-transitory computer-readable storage medium of claim 15, wherein the transitioning the interface circuit from the first operating mode to the second operating mode comprises reducing power consumption of the electronic device in comparison to when the interface circuit is in the first operating mode.

21. The non-transitory computer-readable storage medium of claim 15, wherein the receiving the command comprises enabling the data communication via a wireless local area network (WLAN).

22. A method comprising:
switching from a cellular-telephone network to a wireless local area network (WLAN) for data communication;
transitioning from a first operating mode to a second operating mode in response to the switching, wherein the first operating mode maintains communication with the cellular-telephone network using a first communication protocol and the second operating mode maintains communication with the cellular-telephone network using a second communication protocol with a lower data rate than the first communication protocol;
determining, in the second operating mode, whether a third communication protocol with a lower data rate than the first communication protocol offers a higher voice communication signal strength than the second communication protocol; and
communicating, in response to the determining, with the cellular-telephone network using the second communication protocol or the third communication protocol based at least in part on the communication protocol with the higher voice communication signal strength.

23. The method of claim 22, further comprising:
switching from the WLAN to the cellular-telephone network for data communication; and
transitioning from the second operating mode to the first operating mode in response to switching from the WLAN to the cellular-telephone network.

\* \* \* \* \*